United States Patent [19]

Stadius

[11] Patent Number: 4,635,288

[45] Date of Patent: Jan. 6, 1987

[54] ELECTRICAL SIGNAL MIXING APPARATUS

[75] Inventor: John R. Stadius, Sunbury-on-Thames, England

[73] Assignee: Soundout Laboratories, Ltd., Surrey, England

[21] Appl. No.: 601,602

[22] Filed: Apr. 18, 1984

[30] Foreign Application Priority Data

Apr. 22, 1983 [GB] United Kingdom ................. 8311034
Oct. 13, 1983 [GB] United Kingdom ................. 8327406

[51] Int. Cl.[4] ................................................ H04B 1/00
[52] U.S. Cl. ......................................... 381/119; 381/1
[58] Field of Search ....................... 381/1, 80, 81, 119, 381/123

[56] References Cited

U.S. PATENT DOCUMENTS 4,260,854 4/1981 Kolodny et al. ...................... 381/81
4,292,467 9/1981 Odlen et al. ........................... 381/1
4,479,240 10/1984 McKinley, Jr. ....................... 381/80

OTHER PUBLICATIONS

Chamberlin, Musical Applications of Microprocessors, 1980, pp. 261-268.

*Primary Examiner*—Forester W. Isen
*Attorney, Agent, or Firm*—Charles R. Rhodes; Judith E. Garmon

[57] ABSTRACT

Electrical signal mixing apparatus for recording studio or live performance comprising a plurality of input channels having means for conditioning input signals applied thereto, a plurality of sub-group channels to which the signals from input channels can be selectively assigned, and a pair of output channels which may receive signals directly from the input channels or via the sub-group channels. Routing interconnections between the input, sub-group and output channels are controlled by a microprocessor in dependence on operator selections effected via a single manually operable switch control on each channel. The microprocessor detects destination assignments indicated by operation of the switch on a sub-group or output channel, and act to complete analogue interconnections between input channels and the identified sub-group or output channels upon subsequent actuation of the input channel selector switches. The microprocessor control of routing assignments also allows other functions to be performed, such as storage and retrieval of sets of routing assignments or patches used previously or set up for subsequent use, indication of current routing assignments, muting of selected channels to allow in place solo review of individual input channel signals and the additional possibility of handshake with an external computer for obtaining a video display of the information.

11 Claims, 6 Drawing Figures

FIG 2

ELECTRICAL SIGNAL MIXING APPARATUS

BACKGROUND OF THE INVENTION

The present invention relates to an electrical signal mixing device and particularly to a device commonly termed a "mixer" in the field of audio reproduction and recording.

Such devices are used to route incoming input signals from a plurality of signal sources to one of two output channels or one or more selected sub-group channels selected from a plurality thereof. From the sub-group channels the signals may then be further mixed, again in selected combinations, into two final output channels constituting the left and right recording channels for stereophonic reproduction. For other more specialised applications there may be a greater number of output channels.

Each input and sub-group channel includes means for modifying the parameters and characteristics of the incoming signal, and the precise combination of routing connections determines the nature of the ultimate recording. Because the mixer may be used in different circumstances, even if permanently located in a single recording studio, the number of input channels required and their interconnection with the sub-group and output channels varies substantially from time to time. This is further complicated if the mixer is used, for example, in the generation of output signals during concerts, since the different venues may place different constraints on the siting and number of the signal sources, constituted for example by the microphones or other transducers from which the input signals are generated for the input channels so that changes may have to be made even for the performance of the same musical item when played at different places. Because of these factors it is often the case that a mixer of greater capacity has to be acquired in order to be able to cope with anticipated future developments. Initially, however, substantial parts of the mixer may not be used and if the anticipated developments do not materialise, or if requirements develop in a different way from that anticipated, the mixer may have to be exchanged for one having a different channel arrangement.

In conventional mixers, for the routing of input channels to the sub-group and/or to the output channels mechanical switching units are employed. This means that each input channel must have an associated switch for each of the potential output or sub-group channel connections which may be made. In a mixer having thirty two input channels, twelve sub-group channels (even if grouped as six stereo pairs) and two output channels, this would require 224 double pole switches. This large number of switches constitutes a not inconsiderable part of the cost of the mixer and, moreover, because of their mechanical nature, also represent a potential source of breakdown.

OBJECTS OF THE INVENTION

A primary object of the present invention is to provide a mixer of modular construction which is so formed that additional channels can be introduced without modification to the existing channels.

Another main object of the present invention is to simplify the routing controls for a mixer allowing modular constructions to be used without the need for complicated circuit corrections to be made upon change in the mixer format.

A further object of the invention is to provide a mixer in which routing controls by a microprocessor allow a single channel routing control switch on each channel to make all the required channel routing connections.

SUMMARY OF THE INVENTION

According to one aspect of the present invention, there is provided an electrical signal mixing apparatus having a plurality of input channels, a plurality of destination channels, and means for selectively interconnecting each input channel to an independently selected destination channel, in which the said selected interconnection means includes a microprocessor operative sequentially to address the input channels and to activate electronic analogue switching means to control the routing from an input channel to a selected destination channel in dependence on the status of selectively operable channel routing selectors.

Preferably, the destination channels include a pair of output channels and a plurality of sub-group channels assignable as route destinations for signals from the input channels, the analogue switching means including means for selectively directing signals from the input channels to the sub-group channels and the output channels, and further selectively operable means for selectively directing signals from a sub-group channel to an output channel.

In the preferred embodiment the channel rotating selectors on the destination channels include a single manually operable switch and gating means connecting to the said microprocessor such that upon actuation of the manually operable switch associated with a selected destination channel the microprocessor acts to generate a data signal on data lines thereof identifying the address of the selected destination channel. The analogue switching means preferably includes a decoder/latch circuit for each input channel, connected to the data lines of the microprocessor whereby to receive the channels representing the selected destination channel, and the channel routing selector on each input channel includes a single manually operable switch and gating means for enabling the decoder/latch upon operation of the manually operable switch in coincidence with address identifying signals applied to the address lines of the microprocessor. The decoder/latch output is connected to an analogue switch circuit comprising a plurality of analogue switches selectively operable under the control of the decoder/latch to apply signals from the input channel to selected interconnection lines of the apparatus to which the output channels and the sub-group channels are permanently connected.

The mixer of the present invention has particular advantages since the microprocessor control of routing connections can be effected from a single routing selector switch on each channel, first by selecting a destination for the route (either an output channel or a sub-group channel) and then assigning the input channels to be connected thereto.

This may be achieved by simultaneous or contemporaneous (that is temporally adjacent) activation of associated input and output channel selector switches, constituting the route selecting switches of the input channels and the channel identification means of the sub-group and the channels respectively.

By providing a single route selection switch for each input channel the number of routing switches is reduced to the total number of channels. Thus, with a mixer such as that discussed above having thirty-two input channels, twelve sub-group channels (in six stereo pairs) and two output channels (as one stereo pair) only a total of thirty-nine routing switches are required in place of the 224 switches required by a conventional inline mixing console having mechanical double pole switches for effecting the routing.

In a preferred embodiment the microprocessor has an associated random access memory for storing signals representing the switching status of all the analogue switches of all the input channel routing selectors whereby to store signals representing a whole set or "patch" routing connections from all selected input channels to all selected sub-group channels and output channels.

Thus, a set of connections between a plurality of input channels and a plurality of output channels (which, in the art, is referred to as a "patch") can be identified at a given set of address locations in the memory, which is preferably a random access memory. By providing a random access memory of sufficient storage capacity a plurality of such "patches" may be stored for immediate retrieval without requiring secondary or subsidiary storage means. The apparatus of the present invention may further be provided with a keyboard having switching means for identifying the memory locations in the said random access memory at which signals representing routing connections are stored, whereby to select storage location and to retrieve stored signals selectively. For preventing accidental changes being made during use of the apparatus it may further include selector enable means, the said keyboard including a lock/-unlock key operation of which acts on the selector enable means whereby to enable or to disable the said channel routing selectors. If there is an extended delay after a selector has been operated and no further selections are made the apparatus will automatically lock, for which purpose it includes timer means operable to activate the selector enable means for a predetermined time after the last actuation of one of the said selectors, and to disable further activation thereof after the said predetermined time if no further selector is operated during this time. In the prior art mixing devices separate written notes had to be kept of the interconnections constituting a given patch if it was required to reproduce this patch after the mixing device has been used to set up a different patch. Further, such reproduction of a patch involved the necessary laborious manual operation of setting all of the mechanical switches whereas with the mixer of the present invention it is only necessary to identify a given patch with a single patch identification number representing the set of storage locations in the random access memory previously loaded with the patch data for the whole patch to be immediately and accurately set up. The microprocessor can be programmed to generate a plurality of identification numbers which can be displayed in a suitable seven segment display unit for identifying which of a number of different patches is set up on the mixer at any one time.

The preferred embodiment of the invention is made as a modular system in which the input, output and sub-group channels are all modular units which can be fitted to a supporting frame or replaced with blank modular units to vary the number of units in the mixer. This is possible because of the microprocessor control which allows each channel to be routed by means of only a single channel routing control switch so that no change in the routing controls is required if the mixer is modified at any time.

Embodiments of the invention may also be provided with means for selectively inhibiting all routing connections of a patch whereby to isolate in the mixing apparatus the routing connections from a selected single input channel to the output channels either directly or through a sub-group channel. This allows the so-called "in place solo" review of an individual input channel.

The processor preferably further operates to provide channel connection display of the interconnections made when in its normal working mode (as opposed to the "setting up" mode during which the channel interconnections are selected) by providing illumination of suitable illuminable means indentifying the interconnected channels. For this purpose a lock/unlock control is provided to enable channel selection when in its unlocked state and to inhibit channel selection when locked. In operation of the mixer, when the lock/unlock control is locked and a sub-group channel selector is operated this causes the illumination of the channel indicator means indicating each of the input channels connected thereto. Likewise, operation of the input channel selector in the same circumstances will cause illumination of an indicator on the sub-group channel or channels to which it is connected.

Provision is made for a video monitor to be incorporated with the device for displaying information concerning the patches in the memory. In particular the mixer is provided with a connection port known in the art as an RS232 port for connecting the mixer to an external computer having a V.D.U. In this way information may be displayed, or alternatively any one of a number of stored patches may be called up to the monitor screen for display. The system also allows changes to be made to a stored patch without corrupting a current patch which may be in use at the time.

Other features and advantages of the invention will become apparent from a study of the following description in which reference will be made to the drawings provided purely by way of non-limitative example.

Figure 1:
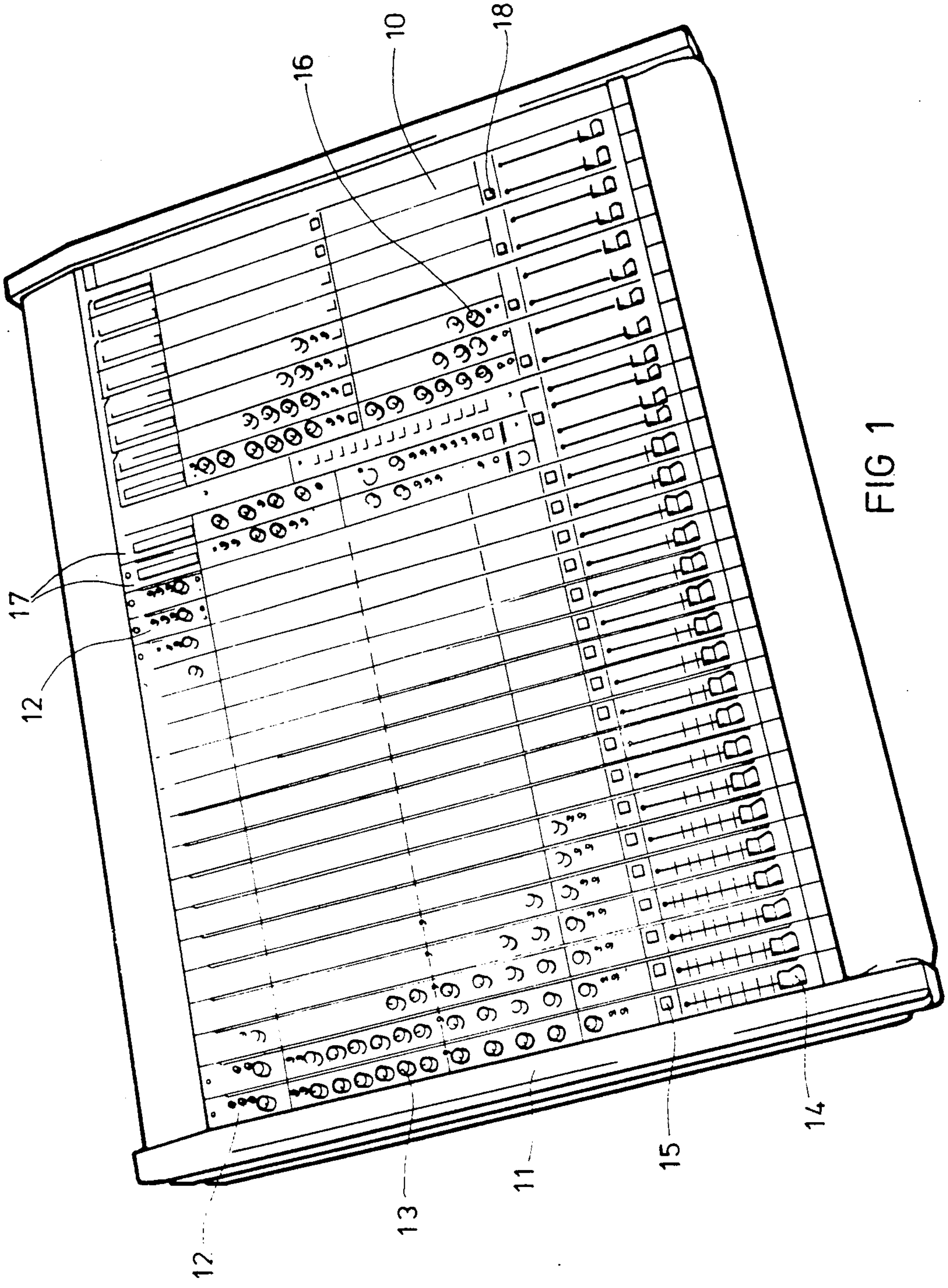
FIG. 1 is an external view of a mixing device formed as an embodiment of the present invention.

Referring first to FIG. 1, the electrical signal mixer shown comprises a generally rectangular casing 11 with a plurality of modular channels extending from top to bottom. These channels are of three types, namely input channels 12, of which there are eighteen in the embodiment of FIG. 1, sub-group channels 10, of which there are eight arranged in four stereo pairs, and two output channels 17. The input channels 12 each has a connector (not shown) for connection with a line leading from a respective signal source, which may be a microphone or other transducer. The input channels 12 have a plurality of control knobs 13 for varying the parameters and characteristics of the input signal, and a volume control or "fader" slide 14 by means of which the relative volume of each input channel can be controlled. Further, each input channel 12 has a routing control switch 15 which is used for making selective interconnections between that input channel and any of the sub-group channels 10 or either of the output channels 17. The sub-group channels do not extend to the top of the mixer casing 11 and the upper region is occupied by a set of auxiliary returns which are known in the art and do not form an inventive feature of the mixer of the present invention.

The sub-group channels 10 have channel routing control switches controlled by push-buttons 18 and are grouped in pairs with a single control switch 19 determining connections of the two channels of a pair to selected input channels. Each sub-group channel pair has a "pan" control which directs a proportion of the signal on a channel to each of the left/right channel parts and the outputs from the sub-group channels are fed to the left or right output channel in proportion determined by the "pan" control which is in the form of a rotary control knob 16.

Figure 2:
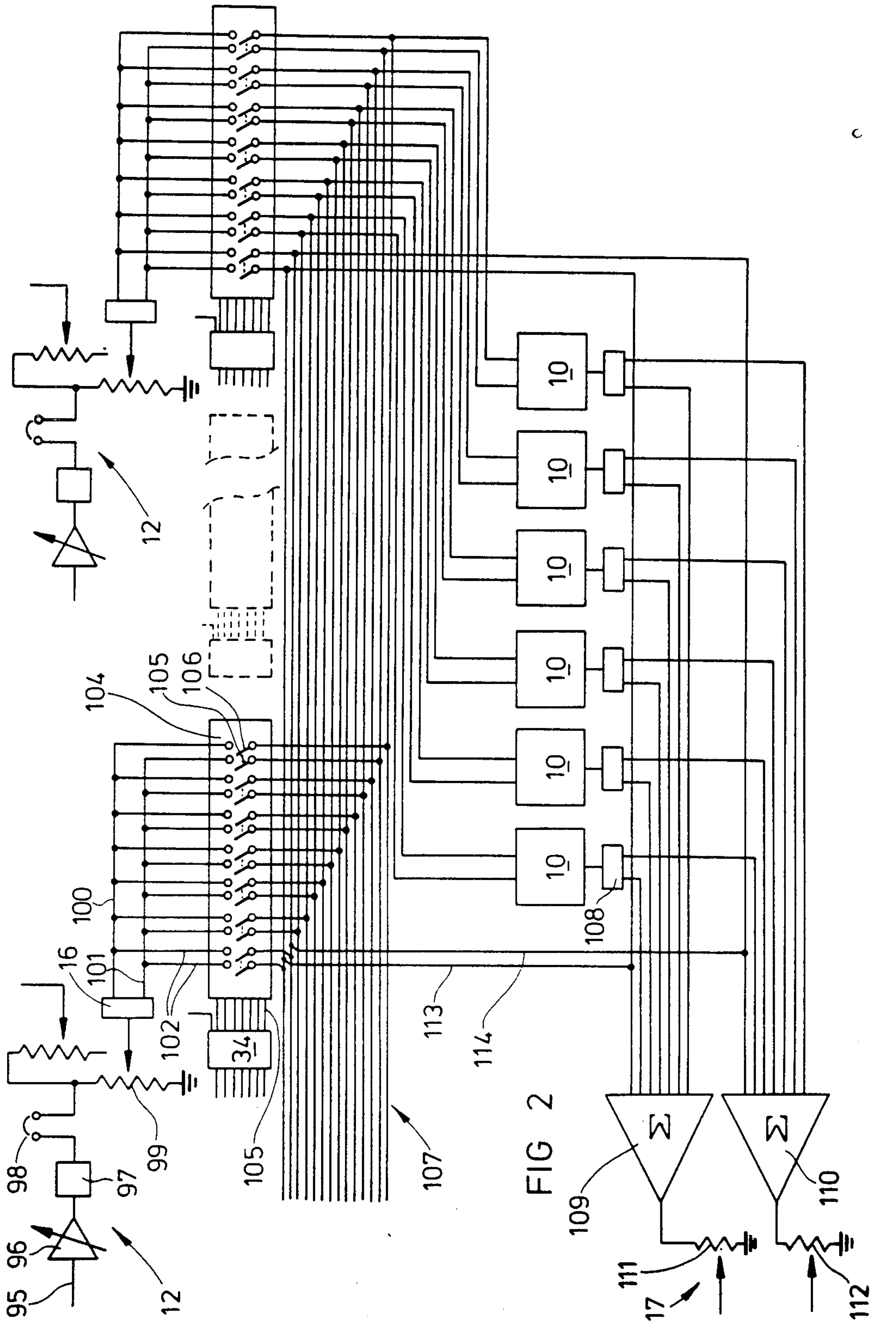
FIG. 2 is a schematic circuit diagram illustrating the analogue interconnection of input channels, sub-group channels and output channels.

As will be described in greater detail below, interconnections between the input channels 12 and the sub-group channels 10 are determined by depression of the route selector push-buttons 18 and 15. The analogue connections made in this way will now be described with reference to FIG. 2, which illustrates two input channels 12 and the interconnections to the two output channels 17 and sub-group channels 10. Only two input channels 12 are illustrated in FIG. 2, and the ghost outline represents the remaining input channels of which, as in the embodiment of FIG. 1, there may be eighteen, although in other embodiments a greater number of channels up to thirty-six may be provided. Each input channel has an input line 95 leading to an amplifier 96, an equalization circuit 97 and an "inject" socket 98, all of which are standard components for audio mixers and will not be described in greater detail here. Other signal modifying circuits may be provided, but as with the circuit components described, these are conventional in the art and do not affect the routing system of the present invention, merely having been illustrated for completeness.

The channel 12 also has a variable resistor 99 which is connected to the slide control 14 to serve as the main volume control or "fade" for the channel. The output from this fade is fed to a pan control 16 operating to direct the signal from the fader 99 onto two respective lines 100, 101 which represent the left and right stereo parts of the signal. Adjustment of the pan control 16 will vary the proportion of the signal fed into the lines 100, 101 from an extreme left hand end position where one hundred per cent of the signal is fed to line 101 and zero to line 100 and an extreme right hand position where the inverse relationship occurs. Each of the lines 100, 101 is connected by seven pairs of lines 102 to seven contact pairs 103 of a set of electronic analogue switches. The whole switching system for the channel 12 may be mounted on a single switch card and in FIG. 2 this has been identified by the reference numeral 104. By applying decoded signals to the appropriate input line 105 to the switch card 104 an appropriate switch is closed to complete the circuit from one or other of the lines 100, 101 to the output side of the card. The switches of the switch card 104 are individually connected to respective lines of a main analogue signal bus 107 the lines of which lead into sub-group channels 10 in respective pairs. The sub-group channels 10 have been illustrated as boxes, but may include conventional signal modifying components such as those illustrated in the input lines 12, or others for conditioning the signal to provide special audio effects, such as "echo" and the like. As described in relation to FIG. 1, each sub-group channel has an associated channel identification switch 18 (not shown in FIG. 2) by which the selected sub-group channel can be identified to the microprocessor for storing the information relating to a selected patch. The outputs from the sub-group channels 10 are fed by respective pan controls 108 to respective summing amplifiers 109, 110 the outputs of which feed variable resistors 111, 112 constituting the main output fade controls of the output channels.

Apart from the interconnections to these sub-group channels 10, each switch card 104 also has a pair of connections leading directly to one of the amplifiers 109, 110 and the left hand input channel 12 of FIG. 2 is shown connected by lines 113, 114. Thus, by suitably closing the switches on the switch card 104 the output lines 100, 101 may be connected either to one of the other summing amplifiers 109, 110 of the output channels, or to a selected sub-group channel Control of the switches is effected by a decoder latch 34 which receives digital information on its input lines and decodes this to control the analogue switches on the card 104. The analogue switches are linked so that the seven outputs on the line 105 from the decoder 34 controls pairs of switches in the array, the first and third switch being connected together for simultaneous operation, and likewise the second and fourth, etc.

The manner in which the digital control signal to be applied to the latch 34 is generated will now be described in relation to FIG. 3.

Figure 3:
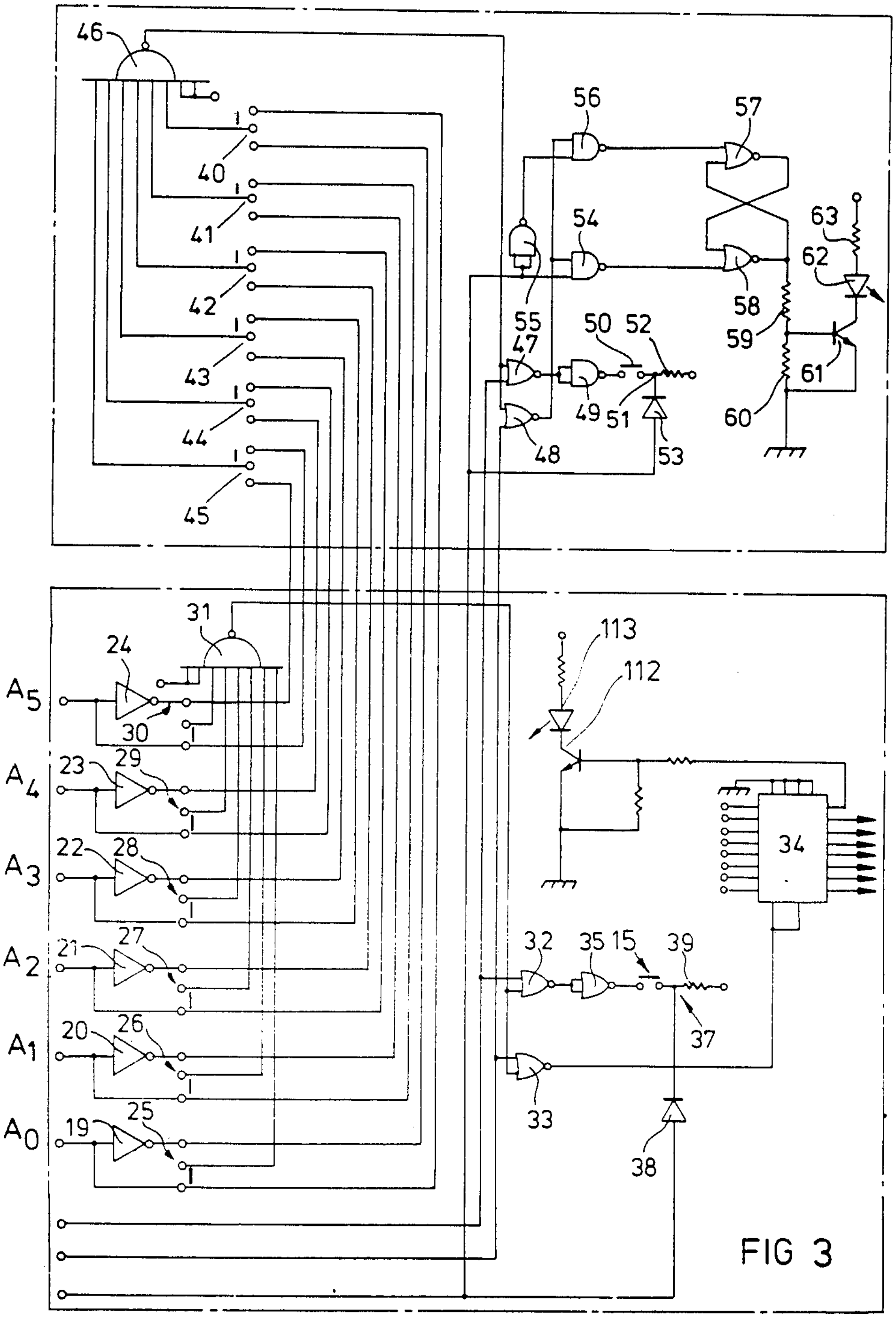
FIG. 3 is a schematic circuit diagram illustrating part of the digital control of the analogue connections.

As will be seen in FIG. 3, address information is applied to six microprocessor address lines labelled $A_0$, $A_1$, $A_2$, $A_3$, $A_4$ and $A_5$. These are connected to inverters 19–24 each of which feeds one pole of a respective double pole switch from the set indicated 25–30. The other pole of the switches 25–30 is connected to the respective address line up-stream of the respective inverter 19–24.

The middle pole of each of the double pole switches 25–30 is connected to a NAND gate 31 the output from which leads to the inputs of two NOR gates 32, 33. The other input of the NOR gate 32 is connected to the "read" line of the microprocessor, and the other input of the NOR gate 33 is connected to the "write" line. The output of the NOR gate 33 is connected to the enable input of the decoder/latch 34 each output from which controls a left/right pair of audio switches from the bank of analogue switches 104.

The output of the NOR gate 32 is connected to both inputs of a NOR gate 35 the output which leads to a routing switch 15 connected at a circuit node 37, to the cathode of a diode 38, and to the positive suppy via a resistor 39. The anode of the diode 38 is connected to the INT line of the microprocessor.

The components described thus far constitute the route selecting part of one input channel of the mixer. The other seventeen input channels are also connected by similar sets of six double pole switches identical to the switches 25–30 to the address lines $A_0$–$A_5$, although the setting of the switches between the inverted and non-inverted lines will be different whereby uniquely to identify each input channel. The microprocessor operates to apply all the different addresses sequentially onto the address lines. The upper part of FIG. 3 illustrate the route selection components of a sub-group channel, which like the input channel has a set of six double pole switches 40–45 for uniquely identifying that channel. Although only one output channel is illustrated in FIG. 2, it will be appreciated that all of the sub-group channels will similarly be connected to the address lines $A_0$–$A_5$. The central poles of the switches 40–45 are connected to inputs of a NAND gate 46 the output of which supplies two inputs of two NOR gates 47, 48. The second input of the NOR gate 47 is connected to the "read" line and the second input of the NOR gate 48 is connected to the "write" line. The output of the NOR gate 47 is connected to both inputs of a NAND gate 49 the output of which leads to a sub-group routing switch 18 connected in a configuration similar to that of the routing switch 15 in the input channel, that is to a node 51 connected to the positive supply via a resistor 52 and to the cathode of a diode 53 the anode of which is connected to the INT line of the microprocessor. The output of the NOR gate 48, on the other hand, is connected to one input of a NAND gate 54 the other input of which is connected to the INT line and the output of which is connected to one input of a NOR gate 58 connected in latching configuration with a NOR gate 57 the second input of which is fed from a NAND gate 56 which receives input signals from the NOR gate 48 and from a NAND gate 55 both inputs of which latter are connected to the INT line. The output of the latching pair of NOR gates 57, 58 is fed via two biasing resistors 59, 60 to digital ground. To the junction between the two biasing resistors 59, 60 is connected the base of a transistor 61 the collector-emitter junction of which is connected in series with a light-emitting diode 62 supplied from the positive digital supply via a resistor 63. The emitter of the transistor 61 is grounded at digital ground.

In operation the address lines are supplied cyclically with sequential addresses and when the address matches that set by the channel selecting switches 25–30 or 40–45 the output of the associated NAND gate such as the gate 46 changes state. When the output of the NAND gate 46 in the sub-group or master channel changes state this enables the two NOR gates 47 and 48 which receive signals also on the read and write lines. The depression of the push-button 50 is sensed on the INT lines in coincidence with the address gated through the NOR gate 47 and the NAND gate 49 and triggers a processor sub-routine to interrogate all the input channel switches as a scan on the read line to determine which of these channel selection switches have been depressed, and to generate, on the data bus, signals representing the address of the sub-group or master channel at which a push-button has been depressed.

As with the sub-group or master channel, when the address on the address bus matches that set on the switches 25–30 to identify that channel the NAND gate 31 changes state and its output, gated with the read and write lines in NOR gates 32, 33, enables these gates to transmit the read and write signals when they are generated; thus when the read or write lines go low, the output from the NOR gates 32 or 33 go high respectively. When the output from the NOR gate 32 goes high, that is as the read line goes low, the output from the NOR gate 35 goes low which forward biases the diode 38 if the route selecting switch 36 is depressed, effectively applying a signal to the INT line. When the "write" line subsequently goes low the NOR gate 33 applies an enable signal to the decoder/latch 34 the outputs of which each control a pair of analogue switches as described in detail above in relation in FIG. 2 to directly connect the input channel to the selected sub-group or output channel.

Figure 4:
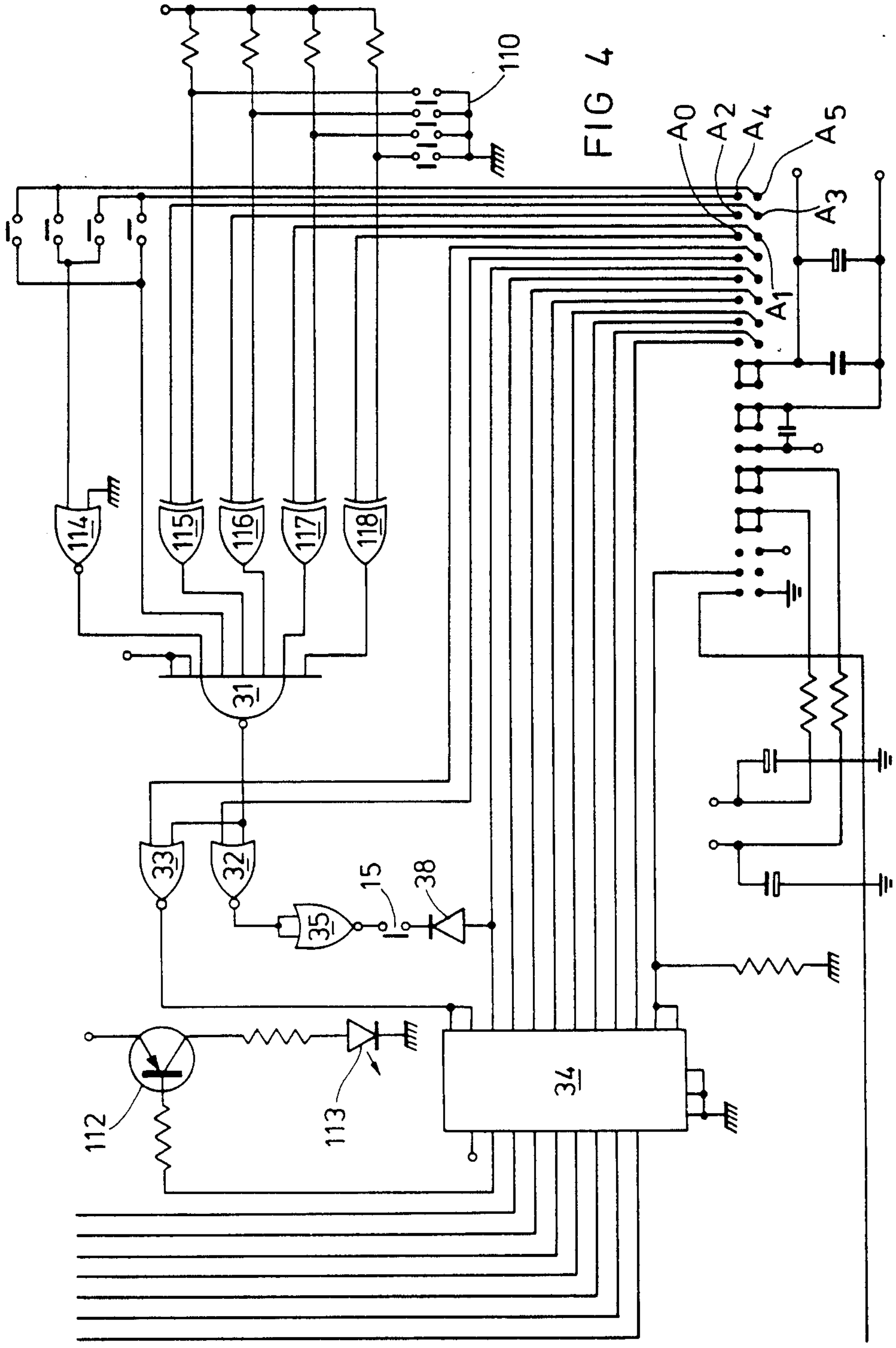
FIG. 4 is a schematic circuit diagram illustrating an alternative form of digital control.

FIG. 4 illustrates an improved input channel routing control circuit in which the expensive double pole switches have been replaced by dual-in-line switches 110 one terminal of each of which is earthed and the other of which is connected via a resistor 111 to the supply voltage.

In FIG. 4 those components which are the same or fulfil the same function as corresponding components in the embodiment of FIGS. 3 will be identified with the same reference numerals. Thus, the latch 34 is fed with data information and controlled via a NOR gate 33 enabled by the microprocessor write line and switched by the NAND gate 31 when the appropriate address appears on the address A0–A5, the NAND gate being gated by a system of exclusive OR gates 114–118 the inputs to which are, respectively, the terminals of the dual-in-line switch 110 which are connected to the power supply and the address lines themselves. In this embodiment, as in the embodiment of FIG. 3, depression of the switch 15 causes the decoder 34 to decode the data on the data lines when the appropriate address appears on the address lines whereby to energize the analogue switches with the decoded output from the decoder 34.

Figure 5:
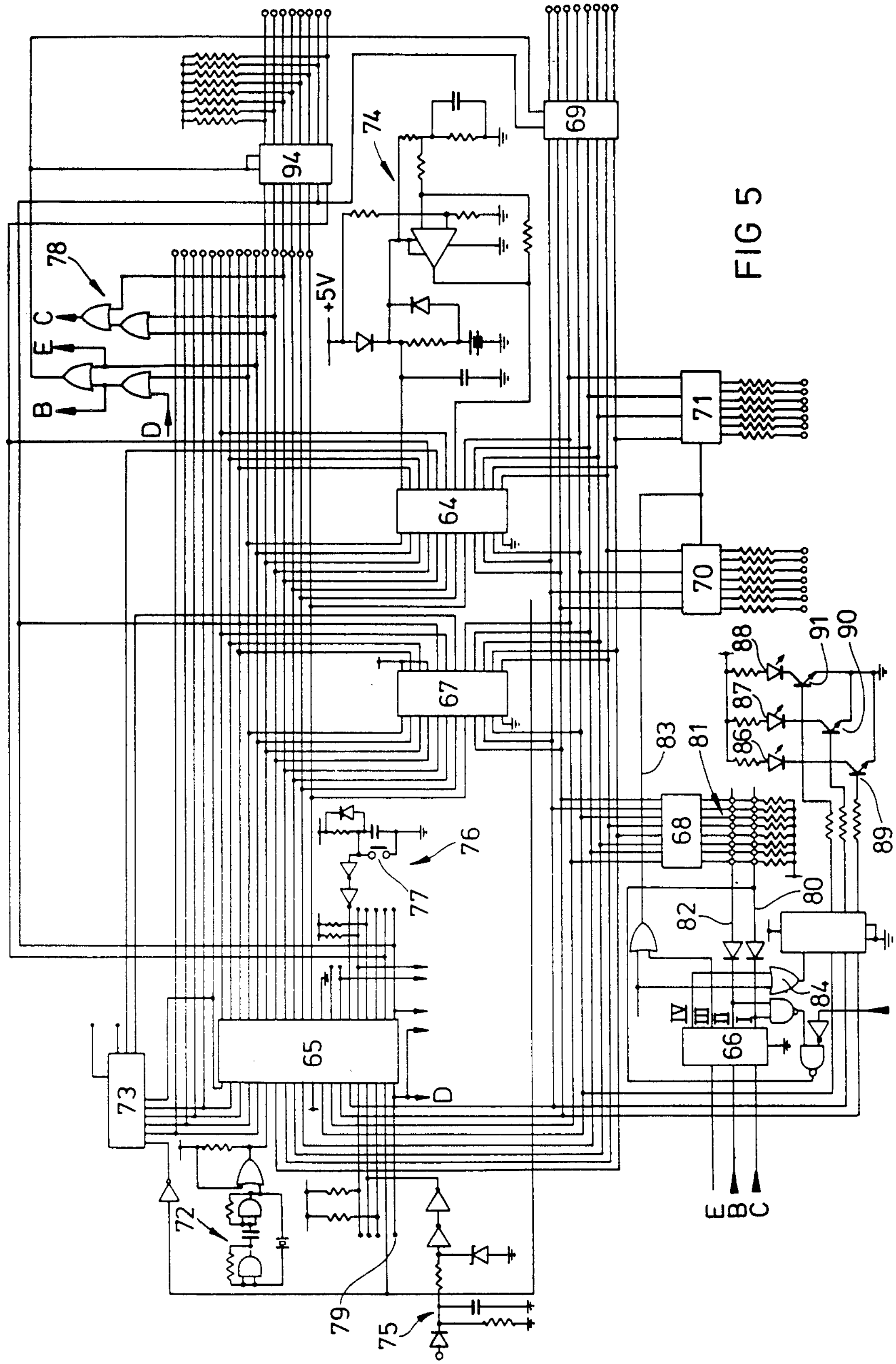
FIG. 5 is a circuit diagram illustrating the general arrangement of the microprocessor control components of an embodiment of the present invention.

The general arrangement of the microprocessor circuit is illustrated in FIG. 5 where the Random Access Memory is shown by the reference numeral 64 connected to a Z80 microprocessor 65 the clock input of which is fed by an oscillator generally indicated 72. A decoder 73 scans the line and writes on to the data bus for transfer and comparison with a look-up table in an EPROM 67. The information stored in the RAM 64 represents the interconnections selected for each of a plurality of patches and, of course, it is important that this information should remain in the memory even if the mixer is switched off, or in the event of power failure. For this reason a battery-powered back-up system, generally indicated 74, is provided to maintain power to the RAM 64 when the mains power is removed for any reason. If the power fails an AC detector generally indicated 75 detects the level and triggers when a certain threshold is reached. This signal is fed to a non-maskable interrupt terminal of the Z80 forcing it into a shutdown routine which preserves the information so that if a power failure occurs the information will be securely retained. In conjunction with the AC detector 75 is a reset system 76 which acts as the threshold is passed on power-up to ensure that the processor starts the programme at the first address location as it commences operation. This ensures synchronisation between the data and address information. A reset button 77 is provided for occasional use should this be required.

The processor 65 has an input/output request pin 79 which, as shown by the arrow D is connected to one input of a gating system 78 the other inputs of which are taken from the address bus and which provide signals at selected address locations which are provided on output B,E and C linked, as shown by input arrows E,B and C respectively to the inputs of a decoder 66. Only at one code will the first of the output pins, identified with the reference numeral I, of the decoder 66 become active, so that the line connected thereto will go low. This line, identified as line 80, is connected to eight switches of a switch pad 81 having sixteen switches the other eight of which are connected to a line 82 and a second pin II of the decoder 66. The switch pad 81 is connected via a buffer 68 to the data bus. At a different address location the decoder 66 will cause the output pin II to go low thereby scanning the second row of switches on the pad 81. These sixteen switches (only fourteen of which are used in the present embodiment) control the special functions of the system and act, for example, to lock or unlock the keyboard from operation on the microprocessor, to store the information, cancel the information, recall the information and so on.

At a further address location the output line III from the decoder 66 goes low. This is gated with the write line of the processor and fed on line 83 as an "enable" signal to decoder/latches 70, 71 which feed data from the data bus to two seven segment display devices (not shown) which identify the patch being operated on at any one time. The decoder latches act on four data lines and provide outputs on seven lines for the seven segment displays.

Further, the decoder 66 has a fourth output pin IV which is also gated with the write line of the processor at a gate 84 and acts to enable a latch 85 which controls three status- indicating light-emitting diodes 86,87,88 via three respective driver transistors 89,90,91 respectively. The first of these status-indicator LEDs namely the LED 86 indicates whether there is an error, the second indicator LED 87 indicates whether the keyboard is locked or unlocked so that it can be programmed, and the third status LED 88 indicates that the system is in the "interrogate" mode enabling the operator to investigate the connection made in other patches without affecting the current patch. These functions are controlled by the switches on the key pads 81, and the status LEDs 86,87,88 operate to indicate which of the associated switches has been pressed.

Figure 6:
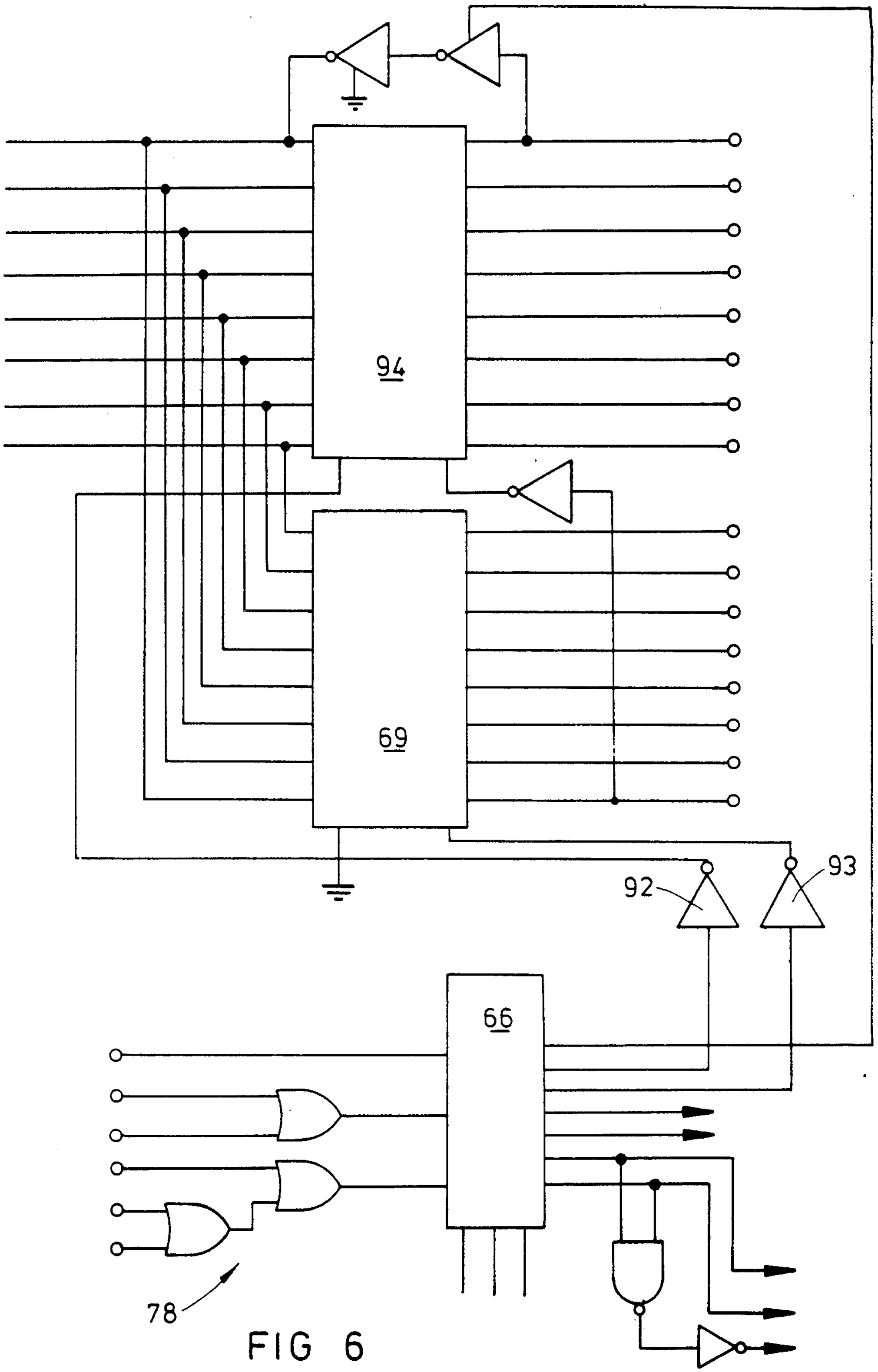
FIG. 6 is a partial diagram illustrating a modification of the embodiment of FIG. 5.

Referring now to FIG. 6 the alternative embodiment illustrated is adapted for the Z80 processor to put all the data and address information on the address lines. The data bus buffer 69 is here shown connected to the address bus and the enable inputs fed via inverters 92,93 required because the data bus buffer 69 in this embodiment and the corresponding address bus buffer 94 are of opposite logic from those in the embodiment of FIG. 3.

The decoder 66 and its input logic 78 correspond to the equivalently identified components in the embodiment of FIG. 5, but the decoder 66 now has further outputs connected to the inverters 92,93 for directly enabling the buffers 69, 94.

In an alternative embodiment (not shown) the microprocessor is adapted to read the SMPTE synchronisation and timing code which is recorded on audiorecording tape in recording studios and the like. This, together with timing control circuits in the mixer enables a current patch to be changed for one stored in the RAM 64 at a predetermined time in a programme.

What is claimed is:

1. In an electrical signal mixing apparatus having a plurality of input channels, means on each input channel for connecting a respective individual source of analogue electrical signals thereto, a plurality of destination channels, and means for selectively interconnecting each said input channel to one or a plurality of independently selectable destination channels, the improvement wherein said selective interconnection means includes;

a plurality of analogue signal lines each connected to respective said destination channels, electronic digitally controlled analogue switching means at each input channel, operative to interconnect the associated said input channel with selected ones of said analogue signal lines, a plurality of address lines interconnecting said input channels and said output channels, a microprocessor operative sequentially to apply signals to said address lines whereby sequentially to address said input channels and said destination channels, selectively operable channel routing selector means interconnected between said address lines and said electronic digitally controlled analogue switching means, each said channel routing selector means including:

a single manually operable selector switch means, and channel identification means connected to said address lines and operable to enable operation of said selector switch means when said channel identification matches the address signals applied to said address lines by said microprocessor whereby said electronic digitally controlled analogue switching means operates to control the routing from any selected input channel to any selected destination channel in dependence on the status of said selectively operable channel routing selectors.

2. The electrical signal mixing apparatus of claim 1, wherein a plurality of data lines interconnect said microprocessor and all said electronic digitally controlled analogue switching means of said input channels, and wherein said selectively operable channel routing selector means on said destination channels include gating means connected to said microprocessor and to the associated said single manually operable selector switch means of said destination channel, said gating means controlling said microprocessor upon actuation of said manually operable selector switch means associated with a selected said destination channel to cause said microprocessor to generate a data signal on said data lines thereof identifying the address of said selected destination channel.

3. The electrical signal mixing apparatus of claim 1, wherein said destination channels include a pair of output channels and a plurality of sub-group channels assignable as route destinations for signals from said input channels, said analogue switching means including means for selectively directing signals from any said input channel to any said sub-group channel or to either of said pair of output channels, and further selectively operable means for selectively directing signals from any sub-group channel to either output channel.

4. The electrical signal mixing apparatus of claim 2, wherein said analogue switching means includes a decoder/latch circuit for each said input channel, each said decoder/latch circuit being connected to said data lines of said microprocessor whereby to receiver said signals representing said selected destination channel, gating means interconnecting said decoder/latch circuit and said channel routing selector switch means on each said input channel said gating means enabling said decoder/latch, upon operation of said manually operable selector switch means in coincidence with address-identifying signals representing the address of said input channel applied to said address lines by said microprocessor.

5. The electrical signal mixing apparatus of claim 4, wherein said decoder/latch circuit is connected to an analogue switch circuit comprising a plurality of analogue switches selectively operable under the control of said decoder/latch whereby to apply signals from said input channel to selected said analogue signal lines of said apparatus.

6. The electrical signal mixing apparatus of claim 5, wherein said microprocessor has an associated random access memory for storing signals representing the switching status of all said analogue switches of all said input channel routing selectors whereby a whole set or patch of routing connections from all selected input channels to all selected sub-group channels and output channels can be stored.

7. The electrical signal mixing apparatus of claim 6, further comprising a keyboard having switching means for identifying the memory locations in said random access memory at which said signals representing said routing connections are stored, whereby to select storage locations and to retrieve stored signals.

8. The electrical signal mixing apparatus of claim 2, wherein the output from each sub-group channel comprises a stereo pair of output lines from a variable pan control device operable to determine the proportion of the overall output signal assigned to each line of said pair, means connecting one line of each said pair to a first output channel and means connecting the other line of each said pair to a second output channel, the apportionment of said sub-group channel outputs to said two output channels being effected entirely by adjustment of said pan control devices.

9. The electrical signal mixing apparatus of claim 2, wherein each said sub-group channel further includes means for conditioning said signals or group of signals arriving from said input channel or channels prior to delivery thereof to the output of said sub-group channel.

10. The electrical signal mixing apparatus of claim 2, wherein each said channel routing selector has an associated illuminable indicator for indicating the status thereof in determining routing connections between said input channels, said sub-group channels and said output channels.

11. The electrical signal mixing apparatus of claim 1, wherein there are further provided means for selectively inhibiting all routing connections of patch whereby to isolate in said mixing apparatus the routing connections from a selected single input channel to the output channels either directly or through a sub-group channel.

* * * * *